April 13, 1937. W. S. COLLENS 2,077,039
THERMOMETER
Filed Aug. 3, 1935

WILLIAM S. COLLENS
INVENTOR

BY
Warren S. Orton
ATTORNEY

Patented Apr. 13, 1937

2,077,039

UNITED STATES PATENT OFFICE 2,077,039

THERMOMETER

William S. Collens, Brooklyn, N. Y., assignor to U. M. A. Inc., New York, N. Y., a corporation of New York Application August 3, 1935, Serial No. 34,505

3 Claims. (Cl. 73—52)

The invention relates in general to an instrument for taking the temperature of any exposed surface, and which instrument is particularly designed for use in taking the temperature of a person's skin and is sometimes hereinafter referred to as a skin thermometer.

The primary object of the invention is to provide a simplified form of surface thermometer by means of which a quick, accurate reading of the temperature of a limited area of the surface can be obtained and at the same time to minimize any errors in temperature readings which might otherwise be imposed by the heat from the operator's fingers, from the external air or from other contiguous heat sources, or from pressure on the thermometer bulb which tends to distort the shape of the bulb and give an error in reading.

Broadly the invention features a holder of heat insulating material in which the bulb end of an ordinary chemical or clinical thermometer is inserted and exposed for contact or near contact with the surface the temperature of which is desired.

Thermometers as hereinbefore constructed especially when made of glass are quite fragile and are liable to become damaged especially at the bulb end when this end is applied quickly to the surface under test or accidentally to any other object. The possibility of breaking the glass bulb end of the thermometer becomes even more prevalent when the bulb is pressed into engagement with the skin or other surface the temperature of which is desired as is usual in applying the thermometer to a person's skin.

Accordingly another object of the invention is to provide a form of holder which will possess at least some slight degree of flexibility so as to conform itself to the surface area under treatment; to provide means for facilitating a gentle pressing of the exposed surface of the bulb into contact with the surface of the skin and otherwise to hold the bulb against movement relative to its holder and incidentally shield and protect the bulb as far as possible.

This aspect of the invention is provided by embedding the bulb of the thermometer so that the bulb will be snugly engaged by and thus protected by the flexible or semiflexible material of which the holder is composed and which holder will contact the bulb on all sides thereof except the limited area side which is exposed for contact with the skin or other surface.

Various other objects and advantages of the invention will be in part obvious from an inspection of the accompanying drawing and in part will be more fully set forth in the following particular description of one form of thermometer embodying the invention, and the invention also consists in certain new and novel features of construction and combination of parts hereinafter set forth and claimed.

Figure 1:
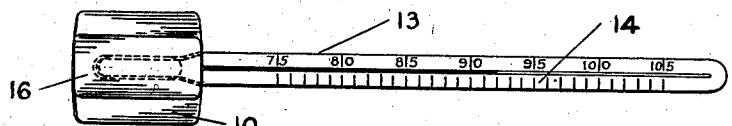
Fig. 1 is a plan view looking down upon a preferred embodiment of the invention.
Figure 2:
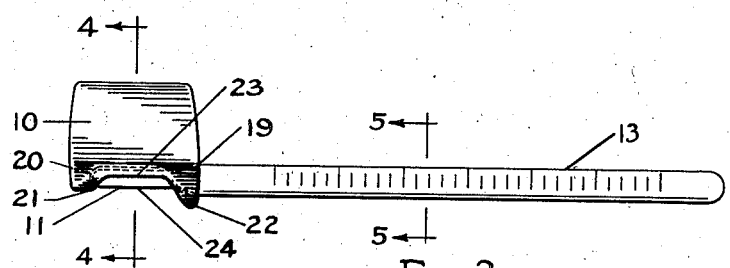
Fig. 2 is a side view of the same.
Figures 4, 5:
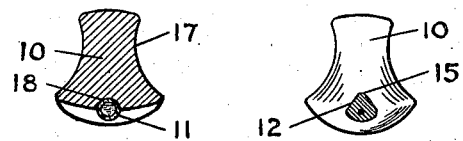

Figs. 4 and 5 are each transverse sectional views taken respectively on the lines 4—4 and 5—5 of Fig. 2.

In the drawing there is disclosed a holder 10 of a heat insulating moldable material such as a phenol condensation product or rubber and into which holder is intruded the bulb 11 of a glass mercury thermometer 12 of conventional design. In the illustrated form of the invention the bulb is of the long, relatively narrow, cylindrical type and the body portion 13 is provided with a degree scale 14 magnified by the usual ridge construction 15 shown in Fig. 5 common with chemical and clinical thermometers.

In the preferred form of the invention illustrated in Figs. 1 to 5, the holder comprises a long block-like body 16 provided on its upper side with a long integral handle or finger piece 17 by means of which the instrument as a whole may be manipulated by the operator when in use. The body 16 is provided with a bore 18 which opens at the end 19 and terminates in spaced relation to the opposite end 20 to form a protecting nose 21 to this end of the instrument. At the opposite end of the instrument the bore is outlined on its lower side by a projecting collar 22 which permits the device to be laid down on a support while elevating the bulb off the support. This collar also functions to provide maximum reinforcement to the constricted portion of the thermometer at the point where it is most liable to break when in use.

Figure 3:
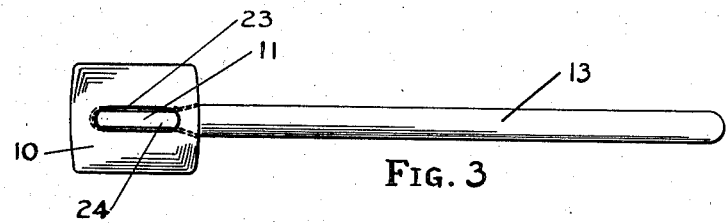
Fig. 3 is a plan view of the underside of the same.

The portion of the bore 18 between the collar 22 and nose 21 is exposed through the lower side of the body and forms an elongated opening 23 shown in Figs. 2 and 3. In this way the lower semi-cylindrical side portion 24 of the bulb of the thermometer is exposed for direct engagement with the surface to be tested. The thermometer as a whole is so inserted in the holder that its scale faces upwardly, that is, in the direction opposite to the downwardly facing exposed side 24 of the thermometer bulb to permit an easy reading of the scale.

In operation, the operator grasps the body of the holder by means of the elongated projecting finger piece and gently presses the bulb end of the instrument into engagement with the surface area the temperature of which is desired. In other words, the thermometer is applied in position on the surface by a lateral movement. The glass bulb itself creates a slight depression in the skin so that the temperature is actually taken from a small shallow depressed area of the skin. In this way the skin itself tends to pocket the heat receiving end of the instrument and tends to prevent the infiltration of heat from the external air or from any other foreign heat sources. With more pronounced pressure exerted by the operator, the portion of the holder outlining the bulb acts on the more or less flexible holder to distort the same and thus insure a more accurate fit between the instrument and the area surrounding the region of the skin under test. While a phenol condensation product has been suggested as the preferred material of which to form the holder, it is suggested especially in those situations where a greater degree of flexibility at the contact face is desired, that the holder be formed of soft rubber or rubberized moldable material capable of providing greater flexibility than is provided by the more rigid form of a phenol condensation product.

It is a feature of the construction that it is formed solely of two parts in the preferred form, that is, an ordinary commercial form of glass thermometer and a molded holder thus featuring economy in manufacturing costs. The parts are free of screw and other connections necessitating machining operations in their construction and are thus free from possibility of rust or contamination when subjected to the sterilizing and cleansing processes to which clinical thermometers are usually subjected. In the preferred form, no metal whatsoever is used.

While there have been shown, described and pointed out in the annexed claims, certain novel features of the invention, it will be understood that various omissions, substitutions and changes in the form and details of the device illustrated and in its operation may be made by those skilled in the art without departing from the spirit of the invention.

I claim:

1. An instrument for taking the temperature of an exposed surface, including a holder of insulating material comprising an elongated body provided on its upper side with an integral finger piece and provided with a longitudinally extending bore open at one end and terminating in spaced relation to the other end to form a protecting nose to that end of the instrument, said bore being exposed through the lower side of the body for a portion of its length, and a glass mercury thermometer having an elongated form of bulb fitted in said bore and at least partly exposed through the lower side of the body for contact with the surface the temperature of which is desired, and said thermometer including a portion projecting from the body and having the projecting portion provided with a scale with the scale facing upwardly whereby the scale can be read while pressing down on the finger piece to bring the bulb into contact with said surface.

2. A device for obtaining the temperature of an exposed surface, including a mercury thermometer provided with a bulb and a stem having graduations on one side thereof, a holder of insulating material provided with a bore in which the bulb is snugly fitted and protected and from which holder bore the graduated stem protrudes, said holder bore being provided with an opening on the side opposite the side of the stem provided with the graduations, said opening exposing the thermometer bulb for contact with the surface the temperature of which is to be taken, said opening facing in one direction and the graduations facing in the opposite direction, and the holder being provided on its lower side with a projecting collar at the portion of the bore from which the stem protrudes.

3. An instrument for taking the temperature of a surface, comprising a glass thermometer provided with a bulb, a holder of heat insulating material provided with a bore in which the bulb is snugly fitted, and said holder bore being provided with an opening for exposing the bulb of the thermometer to the surface, the portion of the holder surrounding the opening being slightly flexible to cause said portion of the holder to conform at least roughly to the contour of the surface engaged thereby, the holder being provided with a bulb protecting nose at one end of the bore, and at its lower side with a projecting collar at the other end of the bore.

WILLIAM S. COLLENS.